Figure 1:
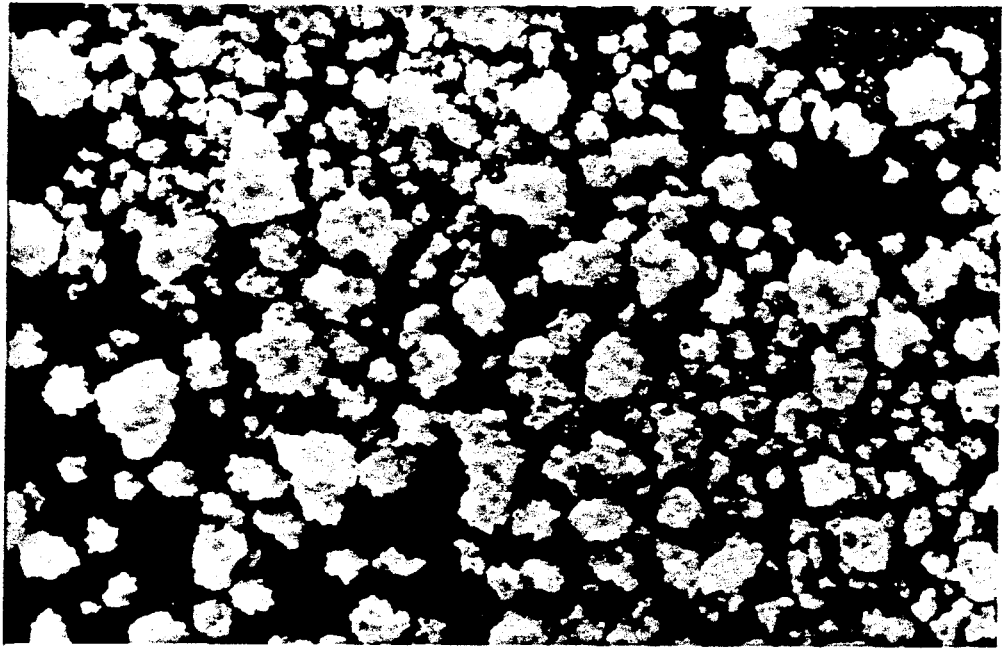

April 6, 1965  B. B. DUGAN  3,177,147
DETERGENT COMPOSITIONS AND PREPARATION THEREOF
Filed Aug. 31, 1961  2 Sheets—Sheet 1

INVENTOR.
BERNARD BARON DUGAN
BY Herbert S. Sylvester 3,177,147
DETERGENT COMPOSITIONS AND
PREPARATION THEREOF
Bernard Baron Dugan, Dunkeld, Johannesburg, Transvaal, Republic of South Africa, assignor to Colgate-Palmolive Company, New York, N.Y., a corporation of Delaware
Filed Aug. 31, 1961, Ser. No. 135,244
Claims priority, application Republic of South Africa, Sept. 23, 1960, 3,895/60
14 Claims. (Cl. 252—99)

This invention relates to detergent compositions in the form of particles of low bulk density and to a process of producing the same.

In accordance with the present invention, a detergent composition comprises solid particles having an apparent density of less than about 0.45 gram per cubic centimeter, said particles being in the form of irregularly shaped spongeous coherent aggregates having a pock marked outer surface and a substantially uniform structure throughout their entire body. As a result of their great exposed surface area and foraminous structure, the instant particles are characterized by a very high rate of solubility in water.

Also in accordance with the present invention, a process for the preparation of a bleached particulate detergent composition having an apparent density of less than about 0.45 gram per cubic centimeter comprises mixing water soluble organic detergent, an inorganic salt, water, and an oxygen-liberating per-compound to form a paste capable of retaining small oxygen bubbles without substantial coalescence thereof, liberating oxygen from said per-compound into said paste in an amount sufficient to bleach said paste and to expand said paste to a final volume at least 2 times the initial volume thereof by the generation of small oxygen bubbles therein, setting the expanded paste under quiescent conditions to a friable mass of substantially said final volume, and granulating said friable mass to form particles of a bleached detergent composition having an apparent density of less than about 0.45 gram per cubic centimeter. The present process is advantageous in that it produces a product of low apparent density, high rate of solubility in water, little tendency towards caking during storage, and excellent color and odor characteristics compared with products made from comparable materials in accordance with presently employed commercial procedures. Moreover, in contrast to many heat dried detergent particles, the instant particles have a negligible content of products of thermal degradation of organic or inorganic constituents and thus are, when made from water soluble materials, completely water soluble. The present process is also advantageous in that it permits the preparation of detergent particles of high moisture content, e.g., 15-35%, which in many cases minimizes caking caused by absorption of moisture from the atmosphere.

Detergents which may be used in the composition and in the process of the present invention are water soluble and synthetic organic in nature and in general should have foaming properties. Suitable detergents are water soluble salts of higher molecular weight sulfuric reaction products of suitable organic compounds such as sodium dodecyl benzene sulfonate and related compounds having about 10–18 carbon atoms in the alkyl group, and the water soluble salts of sulfated higher fatty alcohols containing from about 10–18 carbon atoms such as sodium palm kernel oil alcohol sulfate, sodium lauryl sulfate, and the like. Other suitable synthetic anionic detergents include water soluble soaps of higher fatty acids such as the sodium soap of an 85:15 mixture of tallow and coconut oil fatty acids.

In addition to the anionic detergents, the organic detergent may constitute in whole or in part a synthetic non-ionic detergent such as non-ionic detergents of the polyethylene oxide condensate type, e.g., the condensate of ethylene oxide with polypropylene glycol which condensate contains 80% ethylene oxide and has a molecular weight of about 1700, and iso-octyl phenoxy polyoxyethylene ethanol having about 8.5 ethanoxy groups per molecule, and the like. Similarly, cationic and/or ampholytic detergents may be employed in compatible amounts.

A suitable range of proportions of the organic detergent is from about 2% to about 65% by weight of the finished product, and preferably about 10% to 40% thereof.

The inorganic salt used in the process of the present invention preferably is one which forms a stable hydrate at room temperature. The most highly preferred inorganic salt is Form II pentasodium tripolyphosphate, however other alkaline hydratable polyphosphates such as Form I pentasodium tripolyphosphate and tetrasodium pyrophosphate may also be employed. Likewise, if desired, sodium silicate, trisodium orthophosphate, sodium sulfate, sodium carbonate, sodium bicarbonate, or like alkaline and neutral detergent builder salts may be used in carrying out the process of the present invention.

A suitable range of proportions of the inorganic salt is from about 10 to about 75% by weight of the finished product.

The water content of the paste employed in carrying out the process of the present invention may vary from about 15 to 40% of the paste composition, depending upon the other constituents present and the processing conditions employed. A preferred range for the water content of the paste is from about 20 to 25%. In any event, enough water must be used such that the mass is of a viscosity and fluidity that it can be stirred to form a uniform paste having a consistency which permits it to swell or expand but which prevents rise of oxygen bubbles through the paste and therefore substantially preserves a structure of thoroughly dispersed fine gas bubbles, preventing substantial coalescence of the gas bubbles or loss of gas from the system.

The tendency of gas bubbles to rise through the paste and escape therefrom may be countered, if desired, by inversion of the container in which swelling or expansion of the paste is occurring.

A preferred oxygen-liberating per-compound for use in accordance with the present invention is hydrogen peroxide, which forms oxygen and water on decomposition, providing effective bleaching and swelling. It is easy to incorporate hydrogen peroxide in, and to disperse it thoroughly throughout, the paste so that the oxygen is liberated substantially uniformly throughout the paste to bleach it and to cause it to expand to a desired low bulk density of less than about 0.45 gram per cubic centimeter, preferably from 0.2 to 0.4 gram per cubic centimeter. Under the alkaline conditions and at the elevated temperatures which are preferred at the mixing stage of this process (about pH 9.5 to 11 and a temperature of about 35–60° C.), hydrogen peroxide does not require the presence of any additional reactant but rather decomposes at a suitable steady rate effectively to bleach the detergent composition and to yield small, uniform bubbles of gas. The hydrogen peroxide may not completely decompose. Sometimes up to 15% hydrogen peroxide remains in the final product either as such or possibly as a complex hydrate of the phosphate. Commercial grade hydrogen peroxide of about 20 to 35% concentration, which may contain a stabilizer, is satisfactory for the purposes of the present invention in which it is used in a suitable proportion, e.g., from about 0.25 to about 1.0% by weight of the paste, to confer the desired bleaching effect on, and low bulk density to, the final product.

Oxygen yielding per-compounds other than hydrogen peroxide which may be employed in the instant process include the per-salts, such as, for example, sodium perborate, although in such a case it is usually necessary to use more vigorous conditions, e.g., a paste temperature of at least about 65° C., or the use of a decomposition catalyst, in order to achieve adequate liberation of oxygen while the paste is in a fluid or plastic condition conducive to expansion.

The product may contain other ingredients which impart desirable properties to the paste during processing, to the final product, or to both. Among such ingredients are organic colloidal materials with soil suspending properties, hydrotropes, foam boosters, builders, fillers, coloring agents (in the event a colored product is desired), and the like.

Sodium carboxymethyl cellulose is a preferred example of an organic colloidal material with soil suspending properties for use in the invention. In addition to its known functions as a soil-suspending agent when the finished product is used in laundering, sodium carboxymethyl cellulose appears to affect favorably the hydration of the tripolyphosphate preferred for the purposes of this invention where the formation of the hydrate, and consequent setting of the paste into the friable mass, should be delayed or the rate of hydration slowed to permit expansion of the paste before the paste becomes too rigid in order to yield a product having the desired low bulk density. It may be present from about 0.5 to 1.5%.

A hydrotrope, for example sodium toluene sulfonate or sodium xylene sulfonate at levels on the order of 2% to 10% by weight of the product, is a desirable ingredient during processing because it facilitates the mixing operation and imparts better swelling, expanding or rising characteristics to the paste, and tends towards the production of a crisp, dry powder and one which will not tend to become moist in a humid atmosphere.

A foam booster, e.g., the monoethanolamide of coconut oil fatty acids which is a waxy solid at temperatures below about 65° C., may be used advantageously in the products of the invention, typically in a proportion of from about 2% to 7% of the final product.

Melamine may be incorporated to inhibit the attack of washing solutions on copper and copper-bearing alloys.

Optical brighteners, pigments, preservatives and the like may also be present in the compositions of the present invention in the amounts commonly used in detergent compositions.

The process of the present invention may be carried out on a continuous or a semi-continuous basis, or if the quantity of materials being handled is limited and mixing is rapid and thorough, it may be carried out batchwise.

Continuous or semi-continuous operation involves a continuous mixing operation in which at least two streams of ingredients are continuously proportioned into a suitable mixer where the paste is rapidly formed and from which it is continuously discharged into a suitable container or containers for the quiescent swelling or expanding operation.

Mills or mixers capable of carrying out the continuous mixing step are available on the market, suitable types being colloid paste mills, pin mills and the like.

It is a feature of the continuous process of the invention that the ingredients are mixed together rapidly, almost instantaneously, the paste being expelled from the mixer into a receiver in less than about one minute, so that it may expand, cool and set in a quiescent stage. The word "quiescent" is used in this specification to signify conditions in which the mixing step is complete and expansion is allowed to take place without externally induced agitation.

In the case wherein batchwise operation is employed, it has been found desirable to add the preferred pentasodium tripolyphosphate and hydrogen peroxide to the mixer as the last two constituents, and to add each of these two constituents to the previously mixed components of the paste as quickly as possible. Mixing of the final paste is continued thereafter only for the minimum period of time necessary to accomplish thorough mixing of all constituents. This may be less than one minute, and preferably is on the order of about 30 seconds. After discharge of its contents, it is unnecessary to clean the mixer as a new batch of material may be prepared therein in the presence of a heel of previously mixed materials (amounting to as much as 10% of the new batch) without requiring an increase in the amount of peroxide employed.

In the present process, the gas must expand the paste to the desired degree before hydration of the salt undesirably stiffens the paste, but mixing of the paste should not continue to the extent that a substantial loss of gas occurs.

The mixing operation, be it continuous or batch, is followed by a quiescent resting period in which the hydratable salt and expanding agent are allowed their full scope of action on the ingredients. In the preferred embodiment of the invention the temperature immediately starts to rise as the phosphate hydrates and the whole mass swells as a result of the decomposition of the expanding agent. At this stage the material may be stored in tubs, trays, or other receivers, and in the case of the continuous mixing process, a whole series of containers or drums may be employed, the paste being directed from one to another as filling proceeds.

In normal practice, it has been found that swelling of the paste to at least 2 times, and usually about 2.5 times its initial volume, is complete during the first 15 minutes of the quiescent stage, which proceeds satisfactorily at room temperature without application of external heat, although if desired, the first 30-60 minutes of this stage may take place in a system maintained at a slightly elevated temperature, i.e., up to 65° C. or higher. Thereafter room temperature is adequate for the conduct of the quiescent stage. The expanded material is held undisturbed until it has become rigid, and desirably until it has cooled to a temperature below about 35° C., e.g., suitably about 10 to 48 hours, although it may, once it has solidified, be removed from its container in order to facilitate more rapid cooling. Thus, the rate of cooling may be accelerated by subdividing the expanded material once it has rigidified in its expanded state by spreading it on trays.

Following a quiescent stage or setting period of sufficient time to ensure formation of a frangible product suitable for breaking up, the expanded, friable detergent composition is disintegrated by passage through a cage mill, by manual crushing or otherwise. This may be followed by screening through a sieve as desired. A suitable sieve has apertures of 2 millimeters, and a typical product screened therethrough contains less than 10% by weight of particles which pass through a sieve having apertures of 0.15 millimeter.

Although the instant particles may contain from 15 to 35% moisture, it is normally preferred to diminish somewhat the moisture content of those particulate sieved products which contain more than 20% moisture in order to ensure that they are free flowing in nature and of very low propensity towards caking during storage. Typically, those products of the instant preferred process having a moisture content on the order of about 23% to 25% or higher are processed to adjust their moisture content to a level on the order of 15-20%. Such adjustment may be accomplished by permitting the particulate product to remain exposed to the atmosphere for a number of hours, by placing it in a drying oven, or by briefly exposing it to or suspending it in a current of warm air.

Figure 2:
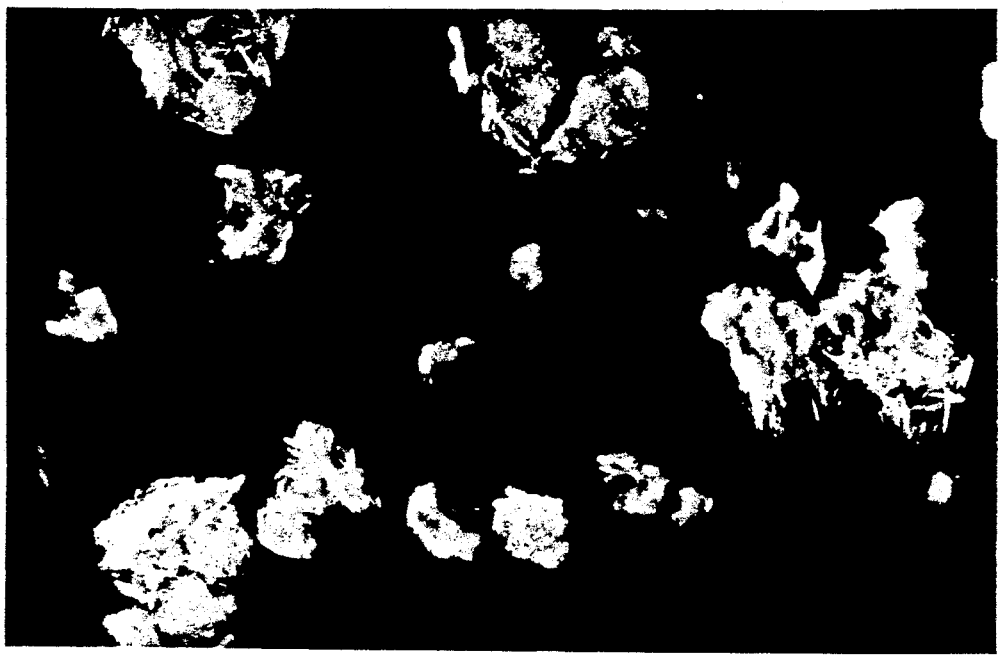
Figure 3:
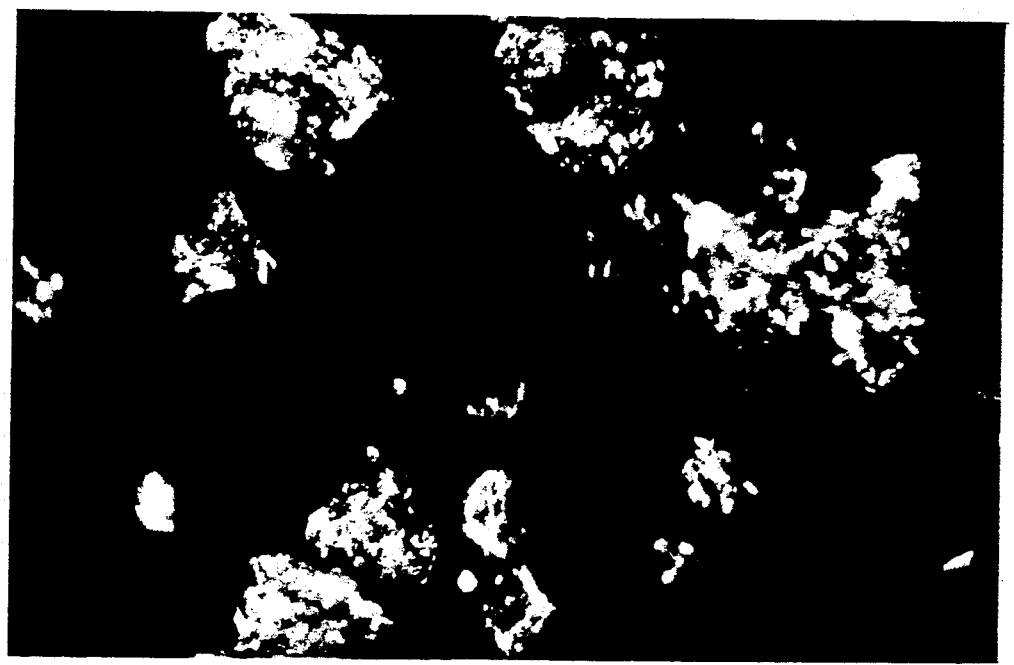

A typical product in accordance with the present invention is illustrated by the accompanying drawings in which:

FIG. 1 is a photomicrograph at about 10 diameters prepared using overhead lighting;

FIG. 2 is a photomicrograph at about 150 diameters prepared using dark field illumination with the particles suspended in a medium of xylene; and FIG. 3 is a photomicrograph prepared under substantially the same conditions used in the preparation of FIG. 2 with the exception that the system of illumination employed is different, the specimen being placed between crossed polarizers in the conventional manner. FIGS. 2 and 3 depict approximately the same field of view and were taken within a short time of each other.

FIG. 1 illustrates the irregular shape of the instant fractured particles, showing their pock marked outer surfaces with their numerous convex faces meeting at acute angles, a structure which presumably derives from the fact that the rigid mass from which these particles are prepared by mechanical action tends to fracture along planes passing through the fine bubbles contained therein. The spongeous, foraminous character of the instant particles, which extends throughout their structure, is believed to form the basis of their high rate of solubility in water. Taking into consideration the fact that the particles of FIG. 1 are reproduced at a magnification of 10×, it is apparent that a substantial majority of the spheroidal voids therein, which represent the gas bubbles formed in the original paste, are of a diameter of about 0.2 millimeter or less, and virtually none of them are larger than about 0.6 millimeter. Thus, substantially all of the particles, which typically have an average diameter of less than about 2 millimeters inasmuch as they have been screened through a sieve with openings of 2 millimeters, exhibit a cross sectional diameter of at least three times the diameter of the largest single gas bubble or void within the particle, and in most instances of at least five times.

FIG. 2 in effect represents an optical cross-section of the instant particles, illustrating again their characteristic irregular shape and numerous convex surfaces. FIG. 2 also indicates that the instant particles exhibit a substantially uniform type of structure throughout their entire cross-section and that they contain as part of their structure, numerous thin platelets of crystalline material arranged in what appears to be an unoriented manner. Similarly, FIG. 3 which also in effect constitutes an optical cross-section of the structure of the particles, discloses that the particles are composed of both crystalline and amorphous material and confirms a number of the structural features discussed in connection with FIG. 2.

The following examples illustrate the invention but are not to be construed as limiting it. The term "apparent density" in these examples and elsewhere throughout the present specification and claims refers to the untamped weight per unit volume of the particulate material as it is charged into a container.

EXAMPLE I

A centrifugal mill having a rotor driven at a rate of about 6,000 r.p.m. is continuously fed with three streams of material. One stream consists of powdered pentasodium tripolyphosphate delivered from a vibratory feeder at a rate of about 680 parts by weight per minute. A second stream consists of a drip feed of 30% hydrogen peroxide at the rate of about 18 parts by weight per minute. The third stream consists of a slurry of the following composition:

| | Percent |
|---|---|
| Water | 16.6 |
| Dodecylbenzenesodiumsulphonate | 30 |
| Sodium silicate (46% water and 54% solids having an Na₂O:SiO₂ ratio of 1:2) | 29.2 |
| Cocomonoethanolamide | 10.5 |
| Sodium toluene sulphonate (commercial grade) | 4.2 |
| Sodium carboxymethyl cellulose (degree of substitution, 0.5; 65% sodium carboxymethyl cellulose, 5% moisture, and a balance of sodium carbonate, sodium chloride, and small amounts of sodium glycolate. Viscosity of a 1.8% solution on a dry weight is 25–40 centipoises) | 2.1 |
| Blue fluorescent dye | 0.2 |
| Melamine | 0.02 |
| Salts (mainly sodium sulphate and a little sodium chloride) | 7.18 |

The slurry constituting the third stream is maintained at about a temperature of about 50° C. and is delivered to the centrifugal mill by a proportioning pump at the rate of approximately 680 parts by weight per minute.

The hold-up time in the centrifugal mill is about 40 seconds, and the discharge therefrom is a continuous flow of paste at a temperature of about 60° C. which is fed into a series of drums, each drum being filled to about ⅓ its capacity to allow for expansion of the paste. After each drum of material has passed through a quiescent period of about five hours at room temperature (about 17° C.), the friable solid mass which has developed is tipped therefrom and the solid is then allowed to remain at room temperature for a further period of 4 to 5 hours before being broken up and subjected to sieving.

The resulting powder is of fine quality with a bulk density of about 0.4 and a composition approximately as follows:

| | Percent |
|---|---|
| Pentasodium tripolyphosphate | 50 |
| Dodecylbenzenesodiumsulphonate | 15 |
| Cocomonoethanolamide | 5 |
| Sodium toluene sulphonate | 2 |
| Sodium carboxymethyl cellulose | 1 |
| Sodium silicate | 7 |
| Water and other ingredients | 20 |

EXAMPLE II

A centrifugal mill having its rotor driven at a rate of about 6,000 r.p.m. is continuously fed with three streams of material. The first stream, which is fed to the mill by a vibratory conveyor at the rate of about 71 parts by weight per minute, is a mixed powder consisting of the following, which previously have been ground into a suitable mix.

| Ingredients: | Parts |
|---|---|
| Pentasodium tripolyphosphate | 30 |
| Detergent flake containing 80% dodecylbenzene sodiumsulfonate, 16% sodium sulfate and 4% moisture | 38 |
| Sodium toluene sulfonate (commercial grade) | 2 |
| Sodium carboxymethyl cellulose of Example I | 1 |
| Fluorescent dye | 0.1 |
| Melamine | 0.01 |

The second stream of material consists of 30% hydrogen peroxide which is drip fed at a rate of two parts by weight per minute, and the third stream of material constitutes a mixture of equal parts of water and the sodium silicate of Example I, which mixture is supplied by a proportioning pump at the rate of 32 parts by weight per minute.

The centrifugal mixer discharges 144 parts by weight per minute of smooth paste into a series of storage drums which, after being charged to approximately ⅓ their capacity with paste issuing from the mixer, are permitted to remain in a quiescent condition at room temperature several hours during which the paste expands and the salt hydrates to produce a light porous block of rigid solid material. The block is broken down into particles having a bulk density of about 0.36 and containing 30% dodecylbenzenesodium sulfonate, 30% pentasodium tripolyphosphate, 8% sodium silicate solids and 22% water, the remaining 10% being minor ingredients and impurities.

In this example the streams fed to the mixer are at room temperature (about 17° C.) except for the diluted sodium silicate, which is at about 45° C. The hold-up time in the mixer is about 40 seconds, and the smooth paste which discharges therefrom is at a temperature of about 55° C.

EXAMPLE III

In this example a batch process is illustrated in which 16.0 parts of water, 12.4 parts of aqueous sodium silicate containing 44.1% of solids having an $Na_2O:SiO_2$ ratio of 1:2.0, 1.9 parts of commercial sodium toluene sulfonate, 1.0 part of commercial sodium carboxymethyl cellulose (75% organic active ingredient), and 0.1 part of fluorescent brightener are thoroughly mixed in a tilting bowl, sigma blade type mixer. 27.2 parts of commercial sodium tridecylbenzene sulfonate (90% sodium tridecylbenzene sulfonate, 8% sodium sulfate and 2% moisture) in the form of drum dried chips are added to the mixer along with 5.8 parts of sodium sulfate. These materials are mixed to form a uniform slurry, which is heated to a temperature of 45° C. while mixing. 33.9 parts of Form II pentasodium tripolyphosphate dry powder are then added to the mixer and thoroughly blended in within the space of about one minute, following which 1.7 parts of a 35% solution of hydrogen peroxide are added to the mixer and the final paste is mixed for 30 seconds. Immediately thereafter the paste is dumped from the mixer into a tub having a volume approximately three times that of the paste (prior to expansion). The material in the tub is permitted to stand quiescently in a room at 25° C. During the first 15 minutes it is in the tub, the paste swells to its final volume, the temperature of the pasterising to about 65° C. in about 30 minutes. The material in the tub is permitted to cool to about 35° C., which in the case of a 28 kilogram batch exposed to an ambient temperature of 25° C. requires about 48 hours. The cooled, rigid material in the tub is then removed therefrom in the form of large lumps, which are passed through a rotating cage mill and then screened through a sieve having square apertures 2 millimeters on a side. The moisture content of the solidified mass is approximately 25% initially, but during the mixing, aging, and screening steps there is a loss of moisture such that the screened particles contain only 22 to 23% moisture. This moisture level is further reduced to about 18% by passing the screened particles briefly through a moving current of warm (95° C.) air in order to improve their caking and flowering characteristics. The product so produced is that of FIGS. 1–3.

If desired, the time of processing involved in the foregoing Example III may be shortened by discharging the paste from the mixer into a large flat pan in a layer about 5 centimeters thick. The pan is then placed in a hot room maintained at a temperature of 65° C. for one-half hour, after which it is removed from the hot room and permitted to remain at room temperature for a period of about two and one-half hours. At this point the cake which has formed is loosened and broken up, and after at least 3 to 5 hours of additional aging, the cake may easily be crumbled and sieved.

The procedure of Example III may be duplicated with substantially the same results if ten parts of sodium carbonate are employed in place of all of the sodium sulfate and part of the polyphosphate therein, or if the tridecylbenzene sulfonate salt is replaced by an equal weight of sodium lauryl sulfate or soap (85:15 tallow:coconut oil soap), or if the sodium toluene sulfonate is replaced by an equal amount of sodium xylene sulfonate.

EXAMPLE IV

The following tabulation indicates the ingredients and parts by weight of a variety of suitable formulations which may be prepared in accordance with the process set forth in Example III, and the moisture content and apparent density of the sieved products. The formula proportions are based on 100 parts of a final particulate product containing approximately 18% moisture, although all but one of the formulations (as indicated) is suitable for sieving and handling at the moisture content indicated for the sieved product. As a result of moisture losses during processing and sieving, the moisture contents of the sieved products are below the total water contents used in the initial pastes (i.e., normally 25%) in order to assure that each paste has a suitable viscosity and fluidity to permit thorough mixing of the components thereof in a short period of time. (NOTE.—In the table, the sodium silicate has a ratio of $Na_2O:SiO_2$ of 1:2.0; the tridecylbenzene sulfonate is the sodium salt; and the ethylene oxide condensate is a condensate with polypropylene oxide, containing 80% ethylene oxide, and has a molecular weight of about 1700.)

*Table*

| | (1) | (2) | (3) | (4) | (5) | (6) | (7) | (8) | (9) | (10) | (11) | (12) |
|---|---|---|---|---|---|---|---|---|---|---|---|---|
| Total water in paste | 25.0 | 25.0 | 25.0 | 31.0 | 25.0 | 25.0 | 25.3 | 24.7 | 25.0 | 35 | 25.0 | 25.0 |
| Sodium silicate | 6.0 | 6.0 | 6.0 | 6.0 | | 6.0 | 6.0 | 6.0 | 6.0 | 6.0 | 6.0 | 6.0 |
| Sodium carboxymethyl cellulose | 0.8 | 0.8 | 0.8 | 0.8 | 0.8 | 0.8 | 0.8 | 0.8 | 0.8 | 0.8 | 0.8 | |
| Fluorescent dye | 0.1 | 0.1 | 0.1 | 0.1 | 0.1 | 0.1 | 0.1 | 0.1 | 0.1 | 0.1 | 0.1 | 0.1 |
| Tridecyl benzene sulfonate | 2.4 | 63.0 | | 19.0 | 27.0 | 27.0 | 27.0 | 27.0 | 27.0 | 19.0 | 27.0 | 27.0 |
| Ethylene oxide condensate | | | 10.0 | | | | | | | | | |
| Total sodium sulfate | 9.1 | 10.1 | 26.1 | 4.1 | 15.1 | 9.1 | 9.1 | 9.1 | 4.1 | 9.1 | 11.1 | 9.9 |
| Pentasodium tripolyphosphate | 61.6 | | 37.0 | | 37.0 | 37.0 | 37.0 | 37.0 | 50.0 | 37.0 | 37.0 | 37.0 |
| Hydrogen Peroxide: | | | | | | | | | | | | |
| (As 35% solution) | 0.6 | 0.6 | 0.6 | 0.6 | 0.6 | | 0.3 | 0.9 | 0.6 | 0.6 | 0.6 | 0.6 |
| (As 20% solution) | | | | | | 0.6 | | | | | | |
| Sodium toluene sulfonate | 2.0 | 2.0 | 2.0 | 2.0 | 2.0 | 2.0 | 2.0 | 2.0 | 2.0 | 2.0 | | 2.0 |
| Tetrasodium pyrophosphate | | | | 50.0 | | | | | | | | |
| Moisture Content of Screened Product, percent | 22 | ¹13 | 22 | 29 | 23 | 22 | 23 | 23 | 21 | 32 | 23 | 23 |
| Apparent Density, Grams/cc | 0.41 | 0.37 | 0.45 | 0.37 | 0.34 | 0.37 | 0.41 | 0.39 | 0.27 | 0.35 | 0.42 | 0.41 |

¹ Required drying prior to screening.

EXAMPLE V

The following ingredients are mixed in a tilting bowl, sigma blade mixer until uniform.

| Ingredient: | Parts by weight |
|---|---|
| Water | 19.9 |
| Sodium silicate (43.5% solids having a ratio of $Na_2O$; $SiO_2$ of 1:2.35) | 6.3 |
| $SiO_2$ of 1:2.35) | 6.3 |
| Sodium carboxymethylcellulose of Example III | 0.4 |
| Polyvinyl alcohol | 0.1 |
| Optical dye | 0.1 |

To the foregoing mixture is added 4.0 parts of the sodium tridecylbenzene sulfonate chips of Example III, and the resulting mixture is agitated and heated to form a smooth slurry at a temperature of 45° C., to which is added a liquid blend of 8.5 parts of the condensation product of nonyl phenol with 9.5 moles of ethylene oxide and 0.7 part of cetyl alcohol, the liquid blend having been heated to 57° C. 26.5 parts of sodium sulfate are then added to the mixer, and agitation is continued to form a uniform mixture at a temperature of approximately 46° C. 31.8 parts of Form II pentasodium tripolyphosphate is rapidly charged to the mixer, and after thoroughly dispersing the polyphosphate throughout the resulting paste within a period of agitation of one minute, 1.7 parts of 35% hydrogen peroxide are added and the final paste is mixed to a uniform composition within the space of 30 seconds. The paste is thereupon discharged from the mixer into a tub, following which the tub is placed in a 65° C. water bath for one-half hour. The tub is then permitted to stand quiescently at room temperature for an additional 48 hours.

The solidified contents of the tub are removed therefrom and disintegrated and sieved as in Example III. The product thus produced is characterized by an apparent density of 0.43 and a moisture content of 20%.

In this example, it is desirable to add the ethylene oxide condensate and cetyl alcohol in the latter part of the mixing procedure in order to prevent formation of semi-solid nodules which begin to appear subsequent to the addition thereof in the presence of the water and hydratable inorganic salts also employed. The formation of these nodules appears to be undesirable in the present process, apparently as a result of the fact on the subsequent addition of hydrogen peroxide, the peroxide does not uniformly penetrate these nodules, bringing about the formation of a product of comparatively high apparent density.

EXAMPLE VI 18.3 parts of 17.6% solution of sodium hydroxide at 18° C. are charged to a tilting bowl, sigma blade mixer. Over a period of 10 minutes, 24.4 parts of tridecylbenzene sulfonic acid at 18° C. (prepared by reaction of sulfur trioxide on tridecylbenzene and containing about 1.5% by weight of sulfuric acid) are charged to the mixer while the agitator is running. The contents of the mixer are agitated for an additional five minutes after all of the sulfonic acid has been added, at which point the temperature of the reaction product, is about 45° C. The following constituents are added to the mixer in the sequence and amounts indicated, the contents of the mixer being warmed if necessary to maintain the contents thereof at about 45° C.

Ingredients: Parts by weight

| | |
|---|---|
| Sodium silicate of Example III | 12.4 |
| Sodium toluene sulfonate | 2.0 |
| Sodium carboxymethyl cellulose of Example III | 1.0 |
| Fluorescent dye | 0.1 |
| Sodium sulfate | 7.0 |

The foregoing materials form a smooth mix within the mixer, to which is rapidly added 33.2 parts of Form II pentasodium tripolyphosphate. Agitation is continued for one minute, following which 1.6 parts of 35% hydrogen peroxide are added and dispersed throughout the paste contained in the mixer, the agitation period following the addition of the peroxide being 30 seconds. The contents of the mixer are then immediately discharged and disintegrated and sieved in accordance with Example III to prepare a particulate product having an apparent density of 0.32 and a moisture content of 24%.

EXAMPLE VII

The process of Example III is repeated with the modification that the hydrogen peroxide, all of the separately added sodium sulfate, and part of the separately added water in a total amount of 7.3 parts are replaced by an equal weight of sodium perborate tetrahydrate, the paste is prepared in the mixer at 65° C., and the product, on discharge from the mixer, is held quiescently at 65° C. on a water bath for one-half hour, following which it is transferred to quiescent storage at room temperature. Subsequent processing is the same as that disclosed in Example III, the particulate product produced being characterized by an apparent density of 0.39 and a moisture content of 22%. The product contains 4.6% available oxygen as perborate, and thus is suitable for use as a bleaching detergent composition if desired.

What is claimed is:

1. A process for the preparation of a bleached particulate detergent composition having an apparent density of less than about 0.45 gram per cubic centimeter which comprises mixing about 2 to about 65% by weight of a water-soluble synthetic organic detergent selected from the group consisting of anionic and nonionic detergents, about 10 to 76% by weight of an inorganic sodium salt selected from the group consisting of alkaline and neutral detergent builder salts which form a stable hydrate at room temperature, about 15 to 40% by weight of water, and an oxygen-liberating per-compound selected from the group consisting of hydrogen peroxide and sodium perborate, to form a paste capable of retaining small oxygen bubbles without substantial coalescence thereof, said per-compound being present in an amount which is sufficient, on decomposition and liberation of oxygen therefrom, to bleach said paste and to expand said paste to a final volume at least two times the initial volume thereof, said mixing being stopped prior to any substantial loss of oxygen generated subsequent to the addition of said per-compound to said mixture, liberating oxygen from said per-compound into said paste in an amount sufficient to bleach said paste and to expand said paste to a final volume at least two times the initial volume thereof by the generation of small oxygen bubbles therein while said paste has a consistency which permits it to expand and to retain such small oxygen bubbles in dispersed form, setting the expanded paste under quiescent conditions to a friable mass of substantially said final volume, and granulating said friable mass to form particles of a bleached detergent composition having an apparent density of less than about 0.45 gram per cubic centimeter.

2. A process for the preparation of a bleached composition as set forth in claim 1 wherein said oxygen liberating per-compound is hydrogen peroxide.

3. A process for the preparation of a bleached particulate detergent composition as set forth in claim 2 wherein the inorganic sodium salt is pentasodium tripolyphosphate, and in which said phosphate and hydrogen peroxide are the last two constituents added in the preparation of said paste.

4. A process for the preparation of a bleached particulate detergent composition as set forth in claim 2 in which said hydrogen peroxide is the last constituent added to said paste and in which mixing subsequent to such addition does not exceed one minute.

5. A process for the preparation of a bleached particulate detergent composition as set forth in claim 1 wherein about 2 to 10% by weight of a hydrotrope selected from the group consisting of sodium toluene sulfonate and sodium xylene sulfonate is mixed with the other ingredients to form said paste.

6. A process for the preparation of a bleached particulate detergent composition as set forth in claim 1, in which said particles initially have a moisture content above 20% and are processed to adjust their moisture content to a level under 20%.

7. A process for the preparation of a bleached particulate detergent composition as set forth in claim 1, in which said paste has a pH of from about 9.5 to 11.0.

8. A process for the preparation of a bleached particulate detergent composition as set forth in claim 1 wherein said oxygen liberating per-compound is sodium perborate.

9. A process for the preparation of a bleached particulate detergent composition having an apparent density of less than about 0.45 grams per cubic centimeter which comprises mixing from about 2 to about 65% by weight of a water-soluble foaming synthetic organic detergent selected from the group consisting of anionic and nonionic synthetic organic detergents, about 10 to 75% by weight of an alkaline hydratable inorganic sodium phosphate salt which forms a stable hydrate at room temperature, about 2 to 10% by weight of a hydrotrope selected from the group consisting of sodium toluene sulfonate and sodium xylene sulfonate, about 15 to 40% by weight of water, and about 0.25 to 1% by weight of hydrogen peroxide, to form a paste capable of retaining small oxygen bubbles without substantial coalescence thereof at a temperature of about 35 to 60° C., mixing of said paste being stopped prior to any substantial loss of oxygen generated subsequent to the addition of said hydrogen peroxide to said mixture, liberating oxygen from said hydrogen peroxide into said paste in an amount sufficient to bleach and to expand said paste to a final volume at least 2.5 times the initial volume thereof by the generation of small oxygen bubbles therein while said paste has a consistency which permits it to expand and to retain said small oxygen bubbles in dispersed form, setting the expanded paste under quiescent conditions to a friable mass of substantially said final volume, and granulating said friable mass to form particles of a bleached detergent composition containing from 15 to 35% moisture and having an apparent density of less than about 0.45 gram per cubic centimeter, said percentages by weight of said organic detergent and inorganic salt being based on the weight of said final product and said percentages of water and hydrogen peroxide being based on the weight of said paste.

10. Solid particles of a detergent composition which particles have a bulk density of less than 0.45 gram per cubic centimeter and an average diameter of less than 2 millimeters, the particles being of a substantially uniform pock-marked spongeous structure containing spheroidal voids the majority of which voids have a diameter not greater than about 0.2 millimeter and substantially none of which is larger in diameter than about 0.6 millimeter, said particles being formed of irregularly shaped coherent aggregates of amorphous and crystalline material including unoriented crystalline platelets, said composition consisting essentially of about 2 to 65% by weight of a sodium salt of a higher alkyl benzene sulfonate in which the alkyl group contains about 10 to 18 carbon atoms, about 10 to 75% by weight of pentasodium tripolyphosphate, less than about 0.15% by weight of a residue of hydrogen peroxide, and about 15 to 35% by weight of moisture.

11. Solid particles of a detergent composition which particles have a bulk density of less than 0.45 gram per cubic centimeter and an average diameter of less than 2 millimeters, the particles being of a substantially uniform pock-marked spongeous structure containing spheroidal voids the majority of which voids have a diameter not greater than about 0.2 millimeter and substantially none of which is larger in diameter than about 0.6 millimeter, said particles being formed of irregularly shaped coherent aggregates of amorphous and crystalline material including unoriented crystalline platelets, said composition consisting essentially of about 2 to 65% by weight of a sodium salt of higher alkyl benzene sulfonate in which the alkyl group contains about 10 to 18 carbon atoms, about 10 to 75% by weight of pentasodium tripolyphosphate, and about 15 to 35% by weight of moisture.

12. Solid particles of a detergent composition which particles have a bulk density of less than 0.45 gram per cubic centimeter and an average diameter of less than 2 millimeters, the particles being of a substantially uniform pock-marked spongeous structure containing spheroidal voids the majority of which voids have a diameter not greater than about 0.2 millimeter and substantially none of which is larger in diameter than about 0.6 millimeter, said particles being formed of irregularly shaped coherent aggregates of amorphous and crystalline material including unoriented crystalline platelets, said composition consisting essentially of about 2 to 65% by weight of a water soluble synthetic organic detergent selected from the group consisting of anionic and nonionic detergents, about 10 to 75% by weight of an inorganic sodium salt selected from the group consisting of alkaline and neutral detergent builder salts which form a stable hydrate at room temperature, and about 15 to 35% by weight of moisture.

13. Solid particles of a detergent composition which particles have a bulk density of less than 0.45 gram per cubic centimeter and an average diameter of less than 2 millimeters, the particles being of a substantially uniform pock-marked spongeous structure containing spheroidal voids the majority of which voids have a diameter not greater than about 0.2 millimeter and substantially none of which is larger in diameter than about 0.6 millimeter, said particles being formed of irregularly shaped coherent aggregates of amorphous and crystalline material including unoriented crystalline platelets, said composition consisting essentially of about 2 to 65% by weight of a water soluble synthetic organic detergent selected from the group consisting of anionic and nonionic detergents, about 10 to 75% by weight of an inorganic sodium salt selected from the group consisting of alkaline and neutral detergent builder salts which form a stable hydrate at room temperature, about 15 to 35% by weight of moisture, and less than about 0.15% by weight of a residue of hydrogen peroxide.

14. A process for the preparation of a bleached particulate detergent composition having an apparent density of less than about 0.45 gram per cubic centimeter which comprises mixing from about 2 to 65% by weight of a sodium salt of a higher alkyl benzene sulfonate in which the alkyl group contains about 10 to 18 carbon atoms, about 15 to 40% by weight of water, about 10 to 75% by weight of pentasodium tripolyphosphate, and about 0.25 to 1.0% by weight of hydrogen peroxide at a pH of 9.5 to 11 and a temperature of about 35 to 60° C., to form a paste capable of retaining small oxygen bubbles without substantial coalescence thereof, said phosphate being added as the penultimate constituent and said peroxide being added as the last constituent of said paste, mixing of said paste being stopped less than one minute after the addition of said hydrogen peroxide and prior to any substantial loss from said paste of oxygen generated by said hydrogen peroxide subsequent to the addition thereof to said paste, liberating oxygen from said hydrogen peroxide into said paste in an amount sufficient to bleach and to expand said paste to a final volume at least 2.5 times the initial volume thereof by the generation of small oxygen bubbles therein, setting the expanded paste under quiescent conditions to a friable mass of substantially said final volume, and granulating said friable mass to form particles of a bleached detergent composition containing from 15 to 35% moisture and having an apparent density of less than about 0.45 gram per cubic centimeter, said percentages by weight of said organic detergent and inorganic salt being based on the weight of said final product and said percentages of water and hydrogen peroxide being based on the weight of said paste.

References Cited in the file of this patent
UNITED STATES PATENTS

| | | |
|---|---|---|
| 2,623,856 | Sanders | Dec. 30, 1952 |
| 2,874,123 | Schaafsma et al. | Feb. 17, 1959 |
| 2,913,417 | Weeks | Nov. 17, 1959 |
| 2,952,638 | Davis | Sept. 17, 1960 |
| 2,972,584 | Schmidt et al. | Feb. 21, 1961 |
| 2,979,464 | Pistor | Apr. 11, 1961 |
| 3,037,838 | Lindner | June 5, 1962 |